United States Patent [19]

Johnson

[11] 4,162,630
[45] Jul. 31, 1979

[54] MEASUREMENT AND RECONSTRUCTION OF THREE-DIMENSIONAL FLUID FLOW

[75] Inventor: Steven A. Johnson, Rochester, Minn.

[73] Assignee: University of Utah, Salt Lake City, Utah

[21] Appl. No.: 725,152

[22] Filed: Sep. 20, 1976

[51] Int. Cl.² ............................................. G01F 1/66
[52] U.S. Cl. ................................................ 73/194 A
[58] Field of Search .................... 73/170 A, 181, 189, 73/194 A

[56] References Cited

U.S. PATENT DOCUMENTS

| | | | |
|---|---|---|---|
| 2,746,291 | 5/1956 | Swengel | 73/194 |
| 3,222,926 | 12/1965 | Carver | 73/181 |
| 3,336,801 | 8/1967 | Snavely | 73/189 |
| 3,555,899 | 1/1971 | Yamamoto | 73/194 |
| 3,633,415 | 1/1972 | Luce | 73/194 |
| 3,940,985 | 3/1976 | Wyler | 73/194 |
| 3,978,726 | 9/1976 | Shih | 73/194 |

OTHER PUBLICATIONS

Johnson et al., Reconstruction of Three-dimensional Velocity Fields, etc., 1975 Ultrasonics Symposium Proceedings.

*Primary Examiner*—Herbert Goldstein
*Attorney, Agent, or Firm*—University of Utah

[57] ABSTRACT

Reconstruction of the three-dimensional fluid velocity vector field in a moving medium from a set of measurements of the acoustic propagation time between a multiplicity of transmitter and receiver locations on a stationary boundary surface. The inversion of the integrals relating the acoustic propagation path to the propagation time measurements is effected by linearization and discrete approximation of the integrals and application of an algebraic reconstruction technique (ART). The result of the process is to obtain the X, Y, and Z components of the fluid velocity vector at every point within a region bounded by a surface containing the acoustic transducers. Since this technique does not require the presence of scattering centers or the optical transparency of the medium, it may be applied in many cases (i.e., turbid, opaque, or chemically pure media) where Doppler or optical (e.g., laser holography) methods fail.

9 Claims, 8 Drawing Figures

MEASUREMENT AND RECONSTRUCTION OF THREE-DIMENSIONAL FLUID FLOW

This invention was made under one or more of the following grants issued by the United States Department of Health Education and Welfare: HL 04664, RR 00007 and HL 00170.

BACKGROUND OF THE INVENTION

Methods for the measurement and description of the flow of fluids (both liquids and gases) may be divided into two main classes: invasive techniques and non-invasive techniques. Invasive methods make use of devices such as probes, the introduction of markers, the measurement of pressure changes across restrictions, etc. The non-invasive methods make use of the external measurement of some flow-dependent property such as those relating to changes in optical properties, acoustic properties, electro-magnetic properties, etc. At the present time, several optical methods exist for gaining information about fluid flows. Laser doppler, schlerean optics, interferometric, holographic, etc., methods are know to the art. These methods require that the fluid be nearly transparent to the incident light. In addition to near perfect fluid transparency, doppler methods require the presence of scattering centers or particles. Natural or artificial dust particles or fluctuations in density can serve this purpose. Low scattering center concentration provides longer ranges but sensitivity suffers. Higher scattering center concentration provides higher sensitivity but limits the range (depth) of measurement. The use of higher transmit power levels increases range and provides a stronger scattered signal but power is usually restricted by practical upper limits. Schlerean, interferometric, and holographic methods work well in general only for gas flows where density variations may be larger than for liquids.

Acoustic methods have also been proposed and applied which make use of either the doppler scattered sound or transmitted sound along a single beam. The use of pulsed doppler methods allows measurement of the component of fluid velocity (not the true fluid veloity) along the acoustic beam. The same trade off between sensitivity, which govern laser doppler measurements also exist for acoustic doppler techniques.

The average fluid velocity component along a transmitted beam can be determined from the measured time of propagation along the beam. Flow meters designed around this principle are well known in the art.

All of these methods suffer from several common weaknesses: first, only the component of flow parallel to the beam is determined; second, only that region of the flow traversed by the beam is sampled. Thus, none of the previously mentioned methods in their simplest form measure true three-dimensional flow.

SUMMARY OF THE INVENTION

According to the present invention, three-dimensional fluid flow can be determined by a new transmission method which overcomes the range and sensitivity problems of doppler methods and which overcomes the averaging problem (determining only the average parallel component) of the single beam transmission delay method. The present method differs from previous methods primarily because it uses a plurality of acoustic rays such that each volume element in the fluid is crossed by many acoustic rays. Each ray propagation time measurement is an integral of a function of acoustic speed and fluid velocity along the ray and the set of such measurements constitutes a simultaneous set of integral equations which may be inverted (solved) to obtain the unknown fluid velocity vector field.

According to the present invention, fluid flow within a measurement region is determined by transmitting and receiving acoustic energy through the measurement region along the plurality or rays such that each volume element within the region in which flow is to be reconstructed is traversed by a set of rays having components in each direction for which flow components are to be reconstructed. The propagation time of the acoustic energy along the plurality of rays is measured. The speed of sound and fluid velocity throughout the measurement region are determined by solving the simultaneous set of line integrals which relate to the fluid velocity and sound speed to the measured propagation time along said rays. In a preferred embodiment of the present invention, a pair of arrays of acoustic transducers are placed along boundaries of the measurement region with the two arrays being in planes which are parallel to each other. Acoustic energy is transmitted and received between pairs of transducers in the plane bounded by one array and the difference in propagation time in each direction between pairs of transducers is determined. Acoustic energy is transmitted between pairs of transducers in opposite arrays and the difference in propagation time between these pairs of transducers is determined. The vector components of the fluid flow within the measurement region is then determined by reconstructing from the sets of propagation time differences.

According to one presently preferred implementation of the invention, a combined impulse and sine wave burst signal is used in transmitting energy through the measurement region. A two-part receiving circuit measures time of flight group velocity data from the impulse, while a phase detector determines phase velocity from the sine wave burst. The coarse data from the impulse is then used to resolve ambiguities in the burst measurement, thus resulting in measurements of increased accuracy.

DETAILED DESCRIPTION OF THE PREFERRED EMBODIMENT

Figure 1:
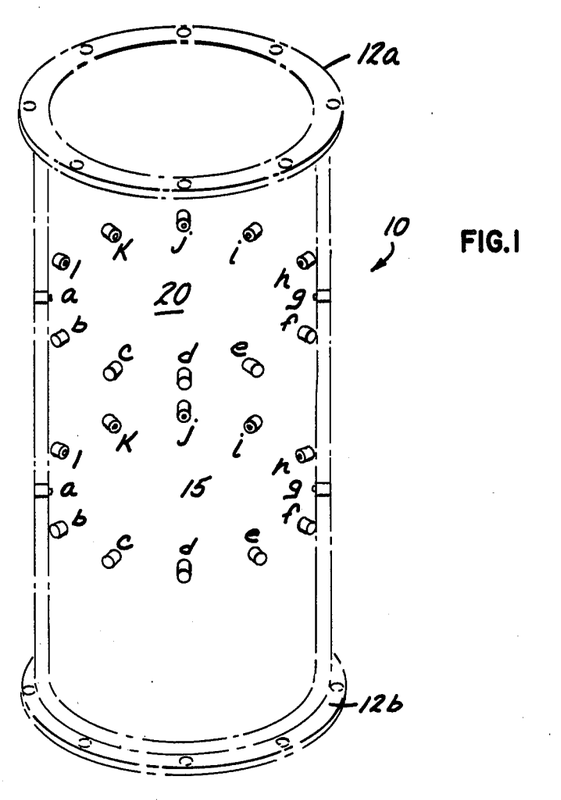
FIG. 1 is a diagrammatic representation of a measurement section of a fluid conduit having a pair of transducer arrays.

FIG. 1 shows a measurement section for a fluid flow conduit or path for use in the present invention. The measurement section, which is generally designated by Reference No. 10, comprises a generally cylindrical conduit 11. In FIG. 1, conduit 11 is shown as being circularly cylindrical, but it will be understood that in general conduit 11 may have any cross-sectional shape that is concave everywhere inside, such as square, round, eliptical or irregular, so long as it does not have any internal concave portions. Conduit 11 can be made from any desired material, according to the nature of the fluid flow being conducted.

Measurement section 10 has a pair of flanges 12a and 12b on either end of conduit 11 for purposes of connecting measurement section 10 into a fluid flow conductor conduit. Measurement section 10 can be connected into the external ductwork (not shown) by bolting flanges 12a and 12b to mating flanges, or by any other suitable connection means.

Measurement section 10 includes a pair of ring arrays of accoustic transducers mounted around the conduit wall. A first array, generally designated by Reference No. 15 includes a plurality of individual transducer elements 15 a through 15 l lying in a first plane generally perpendicular to the cylindrical symmetry axis of conduit 11. A second array of transducers 20 includes individual elements 20 a through 20 l lying in a second plane generally parallel to the plane of array 15, but translated a distance therefrom along the cylindrical symmetry axis of conduit 11. In the embodiment shown, only twelve transducers are shown in each array for purposes of clarity of the figure. However, depending upon the particular application of the invention, a greater or lesser number of transducers can be used. Use of a greater number of transducers will of course permit higher resolution of the reconstruction.

It will be appreciated that the configuration of measurement section 10 is only illustrative of many different shapes depending on the particular application. In other situations such as measurement of flow fields in smoke stacks or cyclone separators, the transducers may be mounted directly in the existing wall. In the case of smoke stacks, it may be desirable to provide suitable cooling means for the transducers.

Figure 2A:
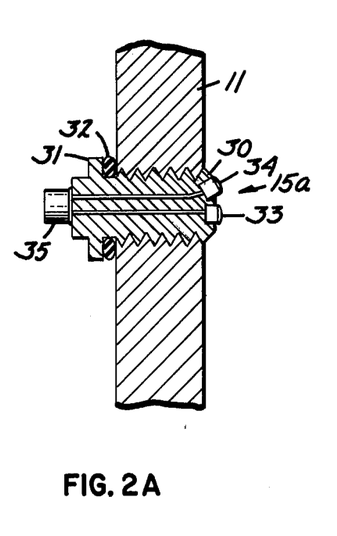
FIGS. 2a and 2b are enlarged sectional details of alternate sensor mounting techniques.

The individual transducers can be mounted on the inside wall of conduit 11 by any suitable means appropriate with the chemical and physical properties, including the temperature and pressure of the fluid within the measurement section. FIG. 2a shows an enlarged cross-sectional detail of one possible type of transducer mounting. Conduit wall 11 has a hole bored therein for receiving one of the transducers, for example transducer 15a. Transducer 15a has a generally cylindrical body portion 30 which is threaded for screwing into the bore hole in conduit 11. The sensor body has a flange 31 which traps a sealing gasket 32 when the sensor body is threaded in place. Mounted within the end of the sensor body facing inwardly of the conduit are a pair of acoustic transducers 33 and 34. Transducer element 33 generates a fan beam for impinging on the other transducer elements within the same ring, while transducer element 34 is placed at an angle to direct its fan beam for reception by the transducers of the other ring array. Both transducers connect through electrical wires to an electrical connector 35 for connection to the rest of the energization and measurement circuitry as explained hereinafter.

Figure 2B:
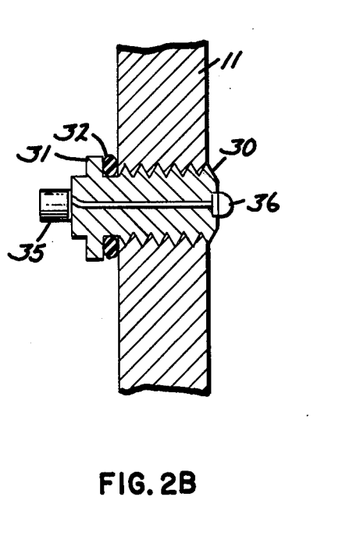

An alternative transducer mounting is shown in FIG. 2b, wherein a sensor body 30 is again threaded into a bore hole provided in conduit wall 11. In the embodiment of FIG. 2b, a single spherical wave is producing by transducer 36 is used for transmitting to all other transducers in both rings. This embodiment symplifies the transducer and electronic processing, but requires proportionately higher energization power.

Figure 3:
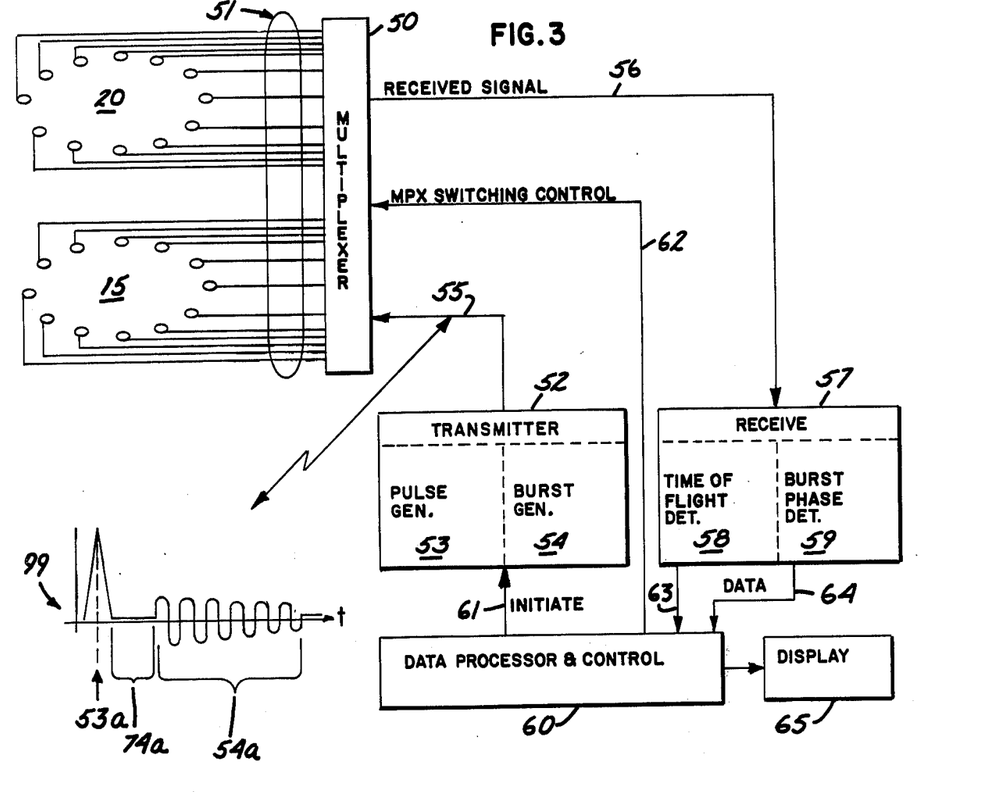
FIG. 3 is a block diagram of a flow measurement and reconstruction apparatus according to the present invention.

Referring now to FIG. 3, there is shown acoustic energization, measurement and processing apparatus according to the present invention. The pair of ring arrays of transducers 15 and 20 are indicated diagramatically. Each individual transducer is connected by an electrical lead to a multiplexer circuit 50. The plurality of electrical leads connecting the transducers to the multiplexer are generally designated by reference no. 51.

A transmitter circuit 52 is provided for generating excitation signals for the transducers. Transmitter 52 includes a pulse generator circuit 53 and a sine wave burst generator circuit 54. The output of transmitter 52 is conveyed to multiplexer 50 by a lead 55.

A signal lead 56 connects from multiplexer 50 to a receiver circuit 57, which includes a time of flight detector 58, and a burst phase detector 59.

A data processor and control unit 60 is provided for controlling the taking of the data and the processing thereof. Data processor and control unit 60 may be a programmed general purpose digital computer, or it could be a specially designed processor having dedicated circuits for performing the specific tasks involved. Data processor 60 connects via control lead 61 to transmitter 52, and via control lead 62 to multiplexer 50. Output data from detectors 58 and 59 are conveyed by a pair of leads 63 and 64 to data processor 60. A display, or other output device, 65 is connected to data processor 60.

In making the set of measurements for a reconstruction, data processor 60 controls multiplexer 50 and transmitter 52 to successively connect different pairs of transducers to the transmitter and receiver. For each pair, signals are transmitted in each direction and the time of transit of the signals through the fluid is measured and stored. The process is continued until data has been measured and collected for the necessary transducer pairs. The data are then processed and the flow vectors at every point are reconstructed as explained more fully hereinafter. The reconstructed values can be displayed on a cathode ray tube or other display, or they can otherwise be made available by an output device.

Figure 4:
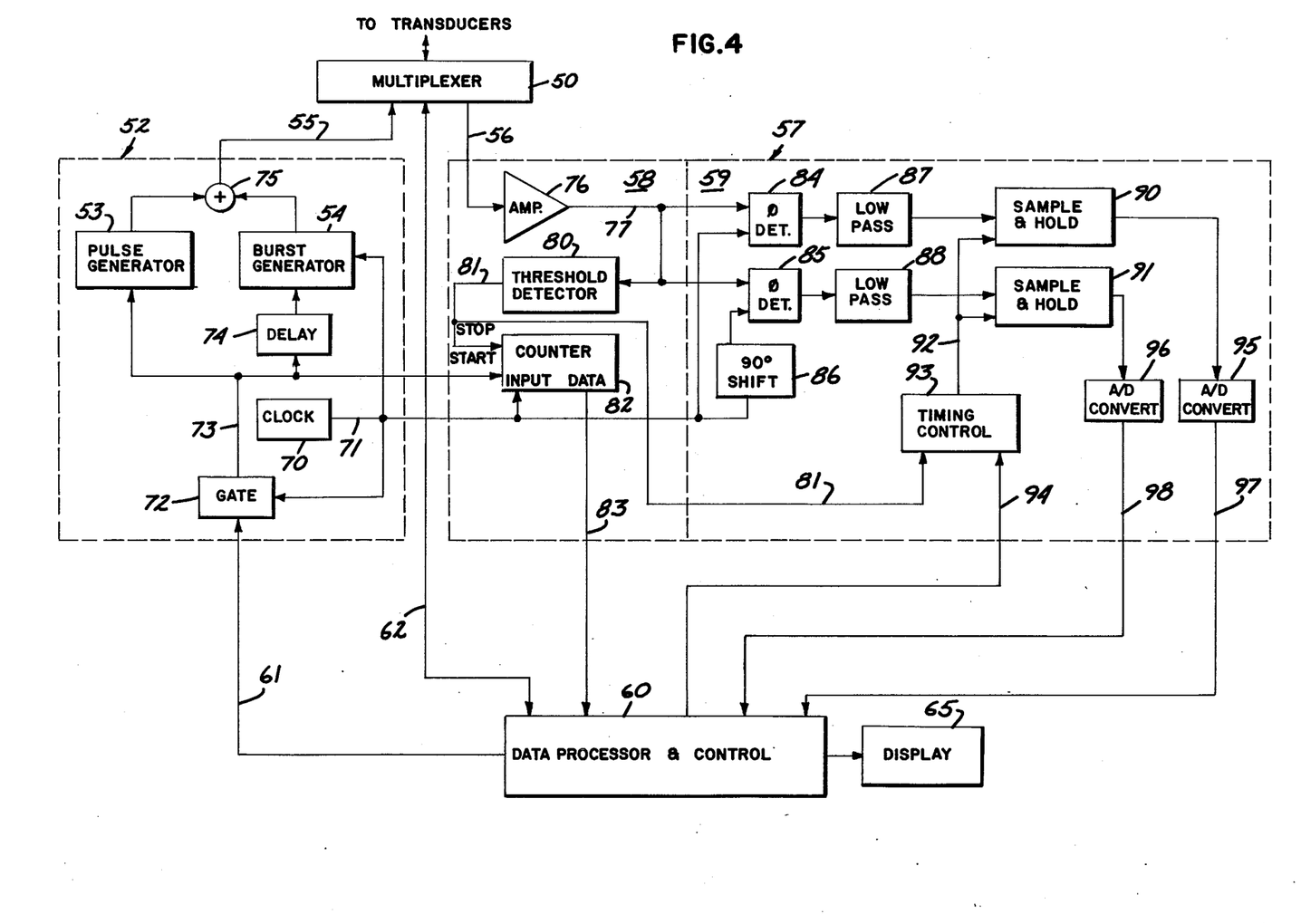
FIG. 4 is a block diagram showing in greater detail the pulse transmission, reception, and timing circuits of the apparatus of FIG. 3.

FIG. 4 shows trnsmitter 52 and receiver 57 in greater detail. Transmitter 52 includes a clock or oscillator 70 whose output connects to a lead 71 for distribution to the various circuits within the system. In particular, lead 71 connects to a gate 72, which also receives an input from lead 61 from the data processor. The output of gate 72 connects to lead 73 which branches to pulse generator 53, a delay device 74, and to a portion of the receiver circuitry which is discussed hereinafter. The outpt of delay device 74 connects to burst generator 54, which also receives lead 71 from the clock. Outputs from pulse generator 53 and burst generator 54 are added at a summing device 75, which then connects through lead 55 to multiplexer 50.

Received signals from lead 56 from the multiplexer are applied to a preamplifier 76 whose output connects to a lead 77. Lead 77 branches, as the output is used both in the time of flight detection portion 58, and in the burst phase detector portion 59. Time of flight detector 58 includes a threshhold detector 80 connected to receive lead 77. The output of threshhold detector 80 is connected to a lead 81, one branch of which connects to the stop terminal of a counter 82. The start input of counter 82 is connected to a branch of lead 73 from the transmitter. The pulse input of counter 82 is connected to a branch of lead 71 to receive frequency from clock 70. Output data from counter 82 connects via lead 83 to data processor and control unit 60.

Burst phase detector 59 includes a pair of phase detectors 84 and 85, which have inputs connected to a branch of lead 77 for receiving preamplified signals from whichever transducer is connected to the receiver. Phase detectors 84 and 85 also receive reference frequency signals at their second inputs. Detector 84 receives the frequency from clock 70 via a branch of lead 71, while detector 85 receives this frequency but shifted by 90° by circuit 86. The outputs of detectors 84 and 85 are passed through a pair of low pass filters 87 and 88, respectively, to the inputs of a pair of sample and hold circuits 90 and 91. Gating commands for sample and hold circuits 90 and 91 are provided via lead 92 from a timing control circuit 93. Lead 94 connects from data processor 60 to timing control 93, and a branch of lead 81 from threshold detector 80 also connects to timing control 93. The outputs of sample and hold circuits 90 and 91 connect to a pair of anolog to digital converters, 95 and 96, respectively. The outputs of these converters connect via a pair of data trunks 97 and 98 to data processor and control 60.

In operation, data processor and control unit 60 causes multiplexer 50 to establish a signal path from transmitter output 55 to one of the transducers, and from another of the transducers to receiver input lead 56, according to a predetermined sequence of pairs of transducers for a measurement set. An initiate signal is then sent on lead 61 to gate 72, so that the next pulse from clock 70 is transmitted via lead 73 to pulse generator 53. In response, generator 53 produces a single pulse or spike. At the same time, delay circuit 74 is activated, and after the predetermined delay, burst generator 54 is activated to send a sine wave signal of predetermined frequency amplitude and duration. For convenience and for accuracy in syncronizing all aspects of the circuit, the frequency and phase of the burst sent can be identical to that generated by clock 70.

The pulse from generator 53 and the burst from generator 54 are summed and applied to the selected transducer. The composite waveform from lead 55 is indicated at reference no. 99 in FIG. 3, in which the vertical scale indicates relative amplititude and the horizontal scale represents time. The spike or single pulse generated by generator 53 is indicated by reference no. 53a. The time delay generated by circuit 74 is indicated by the interval labeled 74a, and the burst duration and character by generator 54 is indicated by reference no. 54a.

It will be appreciated that the time of flight of acoustic energy from one transducer to another could be measured either by an impulse technique or by phase detection of a burst, as may be desired. However, in the preferred embodiment, the combination of the two methods are employed. Time of flight detector 58 responds to the impulse 53a, while burst phase detector 59 responds to the burst 54a, as received by the receiving transducer. Time of flight of the impulse is easy to measure, but suffers inaccuracy somewhat due to noise masking in the threshhold detector of the receiver, and due to the fact that the pulse detector inherently responds to group velocity rather the more accurate phase velocity. The phase detector responds to phase velocity, but is subject to ambiguities at each integral multiple of the wave length. By use of a combination technique, the impulse time of flight gives a coarse measurement which is accurate enough to resolve the wave length ambiguity of the phase detector, and the phase detector then gives a fine measurement for maximum accuracy.

At the time that pulse generator 53 is triggered by lead 73, the same triggering signal is applied to the start input of counter 82, which then begins counting pulses from clock 70. After passing through the fluid, the impulse portion 53a of the composite wave form is detected by threshhold detector 80 which is set for detecting the first significant impulse above the noise level. Detector 80 then supplies a stop signal on lead 81 to the stop input of counter 82. The count then contained in counter 82 is read into data processor 60 over data trunk 83. This number is proportional to the elapsed time, with the proportionality being the frequency of clock 70. Counter 82 may be reset between successive measurements by suppling a reset signal line (not shown) as is generally known in the art.

Phase detector 84 compares the phase of the received burst to the phase of the clock 70. Detector 85 similarly compares the phase of the received burst to the 90° shifted reference signal from clock 70. The use of a pair of detectors one with a shifted reference, is a well-known technique for phase detection and resolving the ambiguity inherent in a single detector. Low pass filters 87 and 88 remove noise from the signals prior to passing to the sample and hold circuits.

Timing control 93 operates to sample the received signal at some point that will fall within the middle of the burst 54a. In general, since different pairs of transducers are different distances apart, the time between transmission and reception will vary. Timing control 93 is therefore set to operate from the output of threshhold detector 80 which detects the impulse 53a. At a predetermined time after reception of the impulse, timing control 93 gates circuits 90 and 91 to insure taking a good sample from the center portion of the burst. Alternatively, timing control 93 can be operated from data processor unit 60 in response to a look-up table of nominally expected transit times for different path lengths.

The samples are held for conversion to digital form by analog to digital converters 95 and 96. The digital quantities are then strobed into data processor and control unit 60, where one value is divided by the other to obtain the phase measurement. The phase measurement is then correlated with a impulse time of flight data from counter 82 to obtain the accurate propagation time value from the transmitting transducer to the receiving transducer.

The procedure is then repeated for successive pairings of transducers until all necessary combinations are covered. Of course, a suitable time delay is provided between successive measurements to allow reflections and echoes within the fluid in the conduit to damp out.

Figure 5:
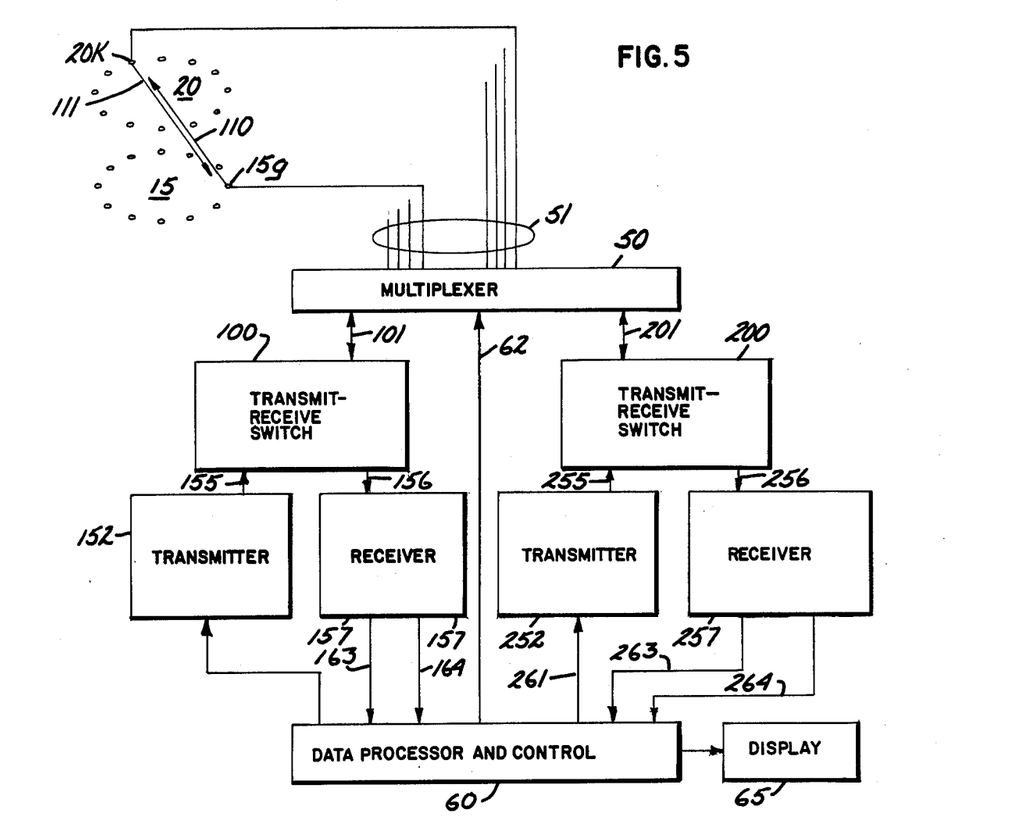
FIG. 5 is a block diagram of an alternate embodiment of the system of FIG. 3.

FIG. 5 shows an alternate embodiment of the apparatus according to the present invention which employs a pair of transmitters and receivers for making simultaneous measurements of the acoustic propagation time in both directions between the transducer pair. The method of the present invention involves finding the difference in propagation time in the two directions between each pair of transducers, and the total time required for a given measurement is reduced by simultaneous measurements of the two directions.

In FIG. 5, as in FIG. 3, transducer arrays 15 and 20 are connected by means of a plurality of electrical lead 51 to a multiplexer 50. Data processor and control unit 60 and display or other output device 65 are also provided. A pair of transmitters 152 and 252 are provided, each being similar to transmitter 52 of FIG. 3. Control lines 161 and 261 connect from data processor 60 to the transmitters, and leads 155 and 255 connect from the outputs of transmitters 152 and 252, respectively.

A pair of receivers 157 and 257 are provided, each of which is similar to receiver 57 in FIG. 3. These receivers receive input signals by means of leads 156 and 256, respectively. They provide outputs from their time of flight detectors and their burst phase detectors by means of data trunks 163 and 164, and data trunks and 263 and 264, which connect to the data processor and control unit 60.

A pair of transmit-receive switches 100 and 200 are interposed between the transmitter-receiver pairs and the multiplexer. Switch 100 connects to leads 155 and 156, and is connected via lead 101 to multiplexer 50. Similarly, switch 200 connects to leads 255 and 256, and connects via lead 201 to multiplexer 50. These switches may be either active or passive in nature as required.

FIG. 5 shows diagrammatically the measurement of acoustic propagation time between the individual transducers 15g and 20k, by way of example. In setting up for this pair of measurements, transmit-receive switch 100 connects transmitter 152 to multiplexer 50 by means of lead 155 and 101. Similarly, transmit-receive switch 200 connects transmitter 252 to multiplexer 50 by means of leads 255 and 201. Multiplexer 50 is then set up by data processor and control unit 60 to connect one of the measurement units to each transducer. For example, assume that lead 101 is connected through multiplexer 50 to transducer 15g, while lead 201 is connected to transducer 20k. At the start of a measurement cycle, pulses and bursts are generated in transmitters 152 and 252 and applied to the transducers. One ray of the wave front generated by transducer 15g is indicated by reference no. 110 travelling towards transducer 20k. One ray from the wave front generated by transducer 20K is indicated by reference no 111 travelling towards transducer 15g. During the transit time for these signals, switches 100 and 200 are switched to the receive mode, either by an internal timer or under control of unit 60. By the time the signals are received by the opposite transducer from which they originated, the signal path has been established from transducer 15g through multiplexer 50, lead 101, switch 100, and lead 56 to receiver 157. Similarly, signal path has been established from transducer 20k through multiplexer 50, lead 201, switch 200 and lead 256 to receiver 257. Timing of the signals is accomplished substantially in the manner as previously indicated with reference to FIG. 4, and the resulting data is strobed into processor and control unit 60 for processing and output or to magnetic tape, or to any other medium, or to display.

Each ray propagation time measurement is an integral of a function of acoustic speed and fluid velocity along the ray and the set of such measurements constitute a simultaneous set of integral equations which may be inverted (solved) to obtain the unknown fluid velocity vector field. The equation which relates the propagation time along each ray from source a to receiver b is given by $$t_{ab} = \int_a^b \frac{ds}{\| \vec{\tau}_m C(\vec{r}) + \vec{V}(\vec{r}) \|} \tag{1}$$

where $\vec{\tau}_m$ is the unit tangent vector along the acoustic ray as seen from the moving medium, $C(\vec{r})$ is the local acoustic speed as seen in the moving media, and $\vec{V}(\vec{r})$ is the fluid velocity vector as measured in the laboratory.

In general the actual ray path taken by acoustic energy from the source a to the receiver b is not known a priori even though the time of propagation may be measured quite accurately. It will be shown that the actual paths may be found either by appropriate simplifying assumptions or from proper mathematical consideration of the complete set of propagation times between many sources and receivers on a boundary surface surrounding (but not necessarily enclosing) the flow. This proof will proceed with the simplest case of fluid velocities much less (10% or less) than the speed of sound and then generalize to higher fluid velocity.

When the velocity of the fluid is everywhere much less than the speed of sound the denominator in equation (1) can be approximated by the expression $(C + \vec{\tau}_m \cdot \vec{V})$ where it is assumed that the ray tangent vector $\vec{\tau}_m$ as seen from a condinate system embedded in the fluid is almost identical to the ray tangent vector $\vec{\tau}$ as seen in the laboratory coordinate system. In most fluids, when $|\vec{V}| << C$ the variations in $C(\vec{r})$ are also correspondly small. With these assumptions, equation (1) can be written as:

$$t_{ab} = \int_a^b \frac{1}{C}\left(1 - \frac{\vec{\tau} \cdot \vec{V}}{C}\right) ds \tag{2}$$

The assumption that $\vec{\tau}_m$ is nearly equal to $\vec{\tau}$ allows the further assumption that the acoustic rays are nearly straight lines. Thus the ray paths may be found in terms of the known source point a and receiver point b. The use of straight line rays provide a further benefit, namely, a simple method for separating the dependance of the time $t_{ab}$ on both $C(\vec{r})$ and $V(\vec{r})$. This separation is obtained by forming the linear combinations $(t_{ab}+t_{ba})$ and $(t_{ab}-t_{ba})$ where now $t_{ba}$ refers to the propagation time between b and a when b serves as the source and a as the receiver.

$$t_{ab} + t_{ba} = 2 \int_a^b \frac{1}{C(\vec{r})} ds \tag{3}$$

$$t_{ab} - t_{ba} = -2 \int_a^b \frac{\vec{\tau} \cdot \vec{V}}{C^2} ds \tag{4}$$

Thus, even if $C(\vec{r})$ is a function of position $\vec{r}$ it may be found by the inversion of the set of many equations (3) corresponding to a well chosen set of ray paths. This solution may be used to define $C^2$ in equation (4) so that may be found from the same or a similar set of ray measurements used to solve equation (3).

Figure 6:
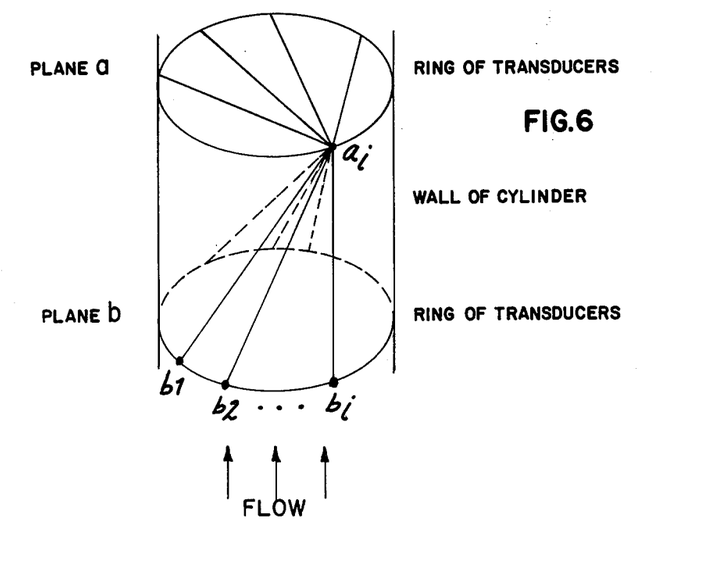
FIG. 6 is a diagram defining the transducers and ray paths used in the mathematical discussion herein.

It is important to choose a set of ray paths which provide a unique solution to equations (3) and (4). Thus care must be taken to choose a geometrical arrangement of transducers which provide path integrals which are linearly independent. One such good arrangements with linear independent integrals is shown in FIG. 6. Flow is assumed in a cylinder formed by translating a closed plane curve, nowhere convex inward, in a straight line (square and circular pipes are members of this set) as shown in FIG. 6. The source and receiver transducers are placed on the intersection of this cylinder and two parallel planes. These planes are shown arranged such that the axis of the cylinder is normal to both plane a and plane b. Ray paths are used from any transducer $a_i$ in plane a to any other transducer $a_j$ in plane a or to any transducer $b_j$ in plane b. As shown in FIG. 6, both rays within a plane and from plane to plane are utilized in this arrangement.

Figure 7:
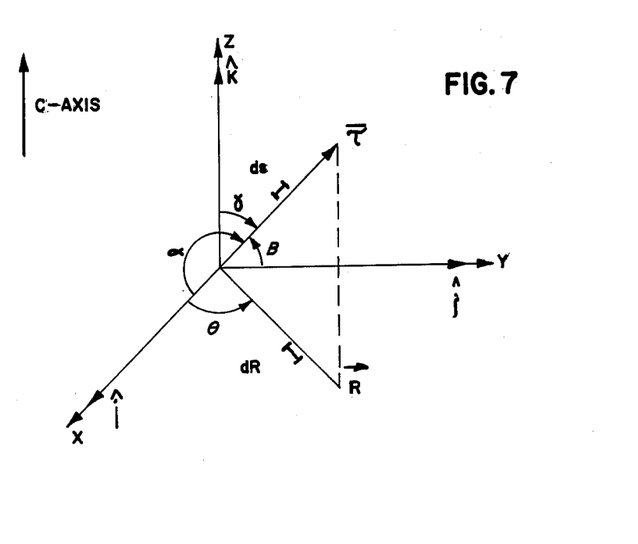
FIG. 7 is a diagram defining the mathematical terms used in the mathematical description herein.

The mathematical form of $\vec{\tau}\cdot\vec{V}$ can be derived by reference to FIG. 7 which shows a coordinate system in a the fluid flow field with the z axis in the direction of the axis of cylindrical symmetry. $\vec{\tau}$ is the unit tangent vector to a flow streamline at an arbitrary point while $\hat{i}$, $\hat{j}$, $\hat{k}$ are unit vectors along the x, y, z axes which are fixed in direction. Here $\vec{R}$ and dR are the projections of $\vec{\tau}$ and ds respectively onto the xy plane. The magnitude of $d\vec{\tau}$ is ds the magnitude of $d\vec{R}$ is dR Here $\alpha$, $\beta$, $\gamma$ are the direction angles and $(R,\theta)$ are the polar coordinates of $\vec{R}$.

With this notation an expression for $\vec{V}\cdot\vec{\tau}$ may be written in terms of components $V_x$, $V_y$ of $\vec{V}$ and the cylindrical coordinates of $\vec{\tau}$. Note that $dR = (\sin \gamma)ds$ where $\vec{\tau} = \vec{R} + \hat{k} \cos \gamma$. With this substitution for $\vec{\tau}\cdot\vec{V}$ equation (4) becomes $$I_o(a_i b_j) = ta_i b_j - tb_j a_i = \qquad (5)$$
$$-2 \int_a^b \frac{1}{C^2} [(V_x \cos\theta + V_y \sin\theta)\sin\gamma + V_z \cos\gamma] \, ds$$

which may be written $$I_2 = [I_o(a_i b_j) - I_1(a_i b_j)] = -2 \cos\gamma \int_{a_i}^{b_j} (1/C^2) V_2 \, dR \qquad (6)$$

where $$I_1(a_i b_j) = -2 \int_{a_i}^{b_j} (1/C^2)(V_x \cos\theta + V_y \sin\theta) dR \qquad (7)$$

The advantage of writing Eq. (6) and (7) in place of (5) is made more clear by noting that $I_1$ from Eq. (7) is independent of $\gamma$. Thus $V_x$ and $V_y$ may be found by taking a sufficiently large set of rays in either plane a or plane b (not from plane a to plane b) and solving the corresponding set of equations (7) for $V_x$ and $V_y$. In other words, $I_0(a_i a_j) = I_1(a_i a_j)$ when $\gamma = \pi/2$ and where $a_j$ is the projection of $b_j$ onto the a plane.

The function $V_z$ may be found without solving Eq. (7) for $V_x$ and $V_y$ if the value of $I_1$ can be found for each $a_i$ and $b_j$. If $a_i$ and $b_j$ are in different planes and if $a_i$ and $a_j$ are their projections along the cylindrical axis onto one plane, then $I_1(a_i b_j)$ is identical in value to $I_1(a_i a_j)$. With $I_2$ determined for each ray in a sufficiently large set of rays from $I_0$ and $I_1$, it is then possible for Eq. (6) to be inverted. Thus, Eq. (6) may be replaced by the following practical formula.

$$I_2 = [(ta_i b_j - tb_j a_i) - (ta_i a_j - ta_j a_i)] = \qquad (8)$$
$$-2 \cos\gamma \int_{a_i}^{a_j} \frac{V_z}{C^2} dR$$

Thus $V_z$ is found from data consisting of measurements between transducer pairs both in the same plane and between distinct planes. The integral in Eq. (7) or Eq. (8) may be written in terms of an approximate discrete sum by subdividing planes a or b into finite elements or pixels. Then dR corresponds to the length of the ray in each pixel. Using this notation Eqs. (7 and 8) become $$I_1(a,i,j)_s = -2 \sum_k \frac{1}{C^2} [V_x(k)\cos\theta_s + V_y(k)\sin\theta_s] L_{sk} \qquad (9)$$

$$I_2(a,b,i,j)_s = -2 \cos\gamma_s \sum_k \frac{1}{C^2} V_2(k) L_{sk} \qquad (10)$$

where $L_{sk}$ is the length of ray s in pixel k. Methods for solving Eqs. (9 and 10) are well known in the art and are, for example, by S. A. Johnson, J. F. Greenleaf, A. Chu, J. Sjostrand, B. K Gilbert, and E. H. Wood, "Reconstruction of Material Characteristics from Highly Refraction Distorted Projections by Ray Tracing," Proc. Image Processing for 2-D and 3-D Reconstructions from Projections, Technical Digest, Optical Soc. Amer., Stanford University, Aug. 4–7, 1975.

The case of nonconstant speed of sound C is also described by equations (3), (6) and (7) or their extensions, such as Equation (9). Thus, the inclusion of $(1/C^2)$ inside the integral or summation is justified because the speed C can be determined by considering the set of equations in a plane as per equation (3). Thus, both $\vec{V}$ and C can be reconstructed even in those cases where C is not a constant. The extension of Equations (3) and (4) to more complex geometries than covered by equation (8) is possible and often straight forward but may result in a more complex data collection and reduction system.

In the example described by equations (9) and (10) and illustrated in FIG. 1, only two planes a and b of transducers were treated. The velocity vector $\vec{V}$ with x, y, and z components) thus reconstructed is representative of the type of flow between planes a and b which is not a function of z. The case where flow changes rapidly with coordinate z can be treated by the use of more than two measuring planes, i.e. more planes than a and b, and by spacing those planes closer together.

In the preceding discussion, it was assumed that measurements were made of one intra-plane data set (i.e. rays $a_i$ to $a_j$ for permutations of i and j) and one inter-plane data set (i.e. rays $a_i$ to $b_j$ for permutations of i and j). It is also possible to collect a second intra-plane data set in the b plane (i.e. rays $b_i$ to $b_j$ for permutations of i and j). This extra data set may be used to average with the a plane to provide an improvement in signal to noise ratio. In this case, the fluid velocity may be considered to be reconstructed on an imaginary plane, half way between a and b.

As has been mentioned equation (9) and (10) can be solved by a modification of the ART algorithm. The ART method is usually applied to reconstruct scalar quantities from their projections. In the operation of this invention, the reconstruction of vector quantities is required. This is accomplished by writing $(\vec{\tau}\cdot\vec{V})$ as $(V_x \cos \alpha + V_y \cos \beta + V_z \cos \gamma)$. At each point along the ray $\cos \alpha$, $\cos \beta$, and $\cos \gamma$ are known. The quantities $V_x$, $V_y$, and $V_z$ are each sought in the $N^2$ pixels (picture elements) in a square array with N pixels on a side. One way to accomplish this task is to modify the ART algorithm to reconstruct a new scalar U in a rectangular array of N pixels by 3 N pixels where the value of U is $V_x$ in the first square sub array of N by N, where U is $V_y$ in the middle square sub array of N by N, and where U is $V_z$ in the last square sub array of N by N. In the case of cylindrical symmetry such as used in equations (9) and (10), only two such square sub arrays are used to solve equation (9) and only one such square sub array is required to solve equation (10).

The problem of reconstructing fluid flows where the velocity of the flow is not insignificantly small compared to the speed of sound requires a more accurate treatment of the ray paths than the straight line approximations of equations (9) and (10). Thus, the ray paths may bend significantly due to both the transformation from moving to laboratory coordinate systems and from acoustic speed variations due to density variations (the latter being more common in gases than liquids). If a complete set of acoustic ray paths could be determined then equation (1) could be inverted notwithstanding its non-linear nature. Techniques are known for finding the ray paths when $\vec{V}(\vec{r})$ and $C(\vec{r})$ are known. One such technique is called ray tracing and has been previously described. (for example, see S. A. Johnson et al, "Reconstruction of Three-Dimensional Velocity Fields and Other Parameters by Acoustic Ray Tracing," 1975 Ultrasonics Symposium Proceedings, 1EEE. Cat. CHO 994-4SU. Also see R. W. White, "Acoustic Ray Tracing in Moving Inhomogeneous Fluids", Journal Acoustical Society of American, Volume 53, No. 6, 1973). Thus, it seems that either the ray paths or $\vec{V}$ and C cannot be found independently.

While many methods could be suggested for finding both the ray paths and $\vec{V}$ and C, for purposes of illustration only an interative technique will be described: First, linear ray paths are assumed on a sufficiently coarse grid (i.e., large pixels). Second, the speed C and velocity $\vec{V}$ are reconstructed. Third, more accurate ray paths are found by ray tracing. It may be necessary to smooth the reconstructions obtained from the previous step before ray tracing. Fourth, equation (1) is solved again for new values of C and $\vec{V}$ using the ray path from step three. Steps three and four may be repeated many times as the grid size is made smaller.

The case for supersonic flow requires special treatment because there may be transducer pairs for which it is impossible to find linking rays (sound cannot travel upstream in supersonic flows). Nevertheless, it seems probably that in many cases of this type, a suitable set of equations may be obtained when proper consideration is given to transducers placement.

Many applications exist for this invention. One application of the invention is the design and construction of improved flow meters for liquids and gases. The ability to reconstruct the local speed of sound allows inference of local density and temperature changes. The combination of velocity and density reconstructions permits the reconstruction of local and net mass flow rates. The inclusion of percent mass per volume of trace materials or pollutants permits the calculation of total mass flow of such materials in pipes, flues, or smoke stacks. Also, the total energy flow may be calculated in regions around wind power extraction machines such as windmills, wind turbines, or vortex towers or vortex power devices. In some circumstances, the temperature of a gas flow may be reconstructed. That this is possible may be seen by observing that the speed of sound in a monoatomic gas is given by $$C = \sqrt{(C_p/C_v)KT} \tag{11}$$

where C is the speed of sound $C_p$ and $C_v$ are the heat capacities at constant pressure and constant volume respectively, K is a constant proportional to the molecular weight of the gas, and T is the temperature of the gas in degrees Kelvin. Thus, a reconstruction of C when squared and rescaled provides a reconstruction of the temperature T (or the molecular weight if T is known).

If the gas has no sources or sinks, then the continuity equation $$\nabla \cdot (\rho \vec{V}) = 0 \tag{12}$$

where $\rho$ is density and $\vec{V}$ is velocity, may be integrated throughout the region where C and $\vec{V}$ were previously reconstructed. This integration will require some assumptions on the value of on some suitable boundary. The integral of Eq. (12) is a reconstruction of the density function $\rho$. The pressure distribution may be obtained by using the gas law, $P = \rho RT/M$ (here, M is the gas molecular weight, R is the gas constant, P is the pressure, $\rho$=density, T=absolute temperature) and the reconstructions of $\rho$ and T. Thus, a reconstruction of pressure is possible. The technique of measuring temperature may be extended to mixtures of gases using average molecular weights.

As has been seen, the data collected by the apparatus may be processed by algorithms of various levels of sophistication (e.g. straight lines or curved line reconstruction). One further level of improvement would involve the use of certain fluid dynamic equations such as the continuity equation, the momentum equation, and/or the energy equation (or their equivalents) as constraints in the solution of equation (1). This may lead to greater accuracy in reconstruction or allow reconstruction with less data.

I claim:

1. The method of measuring the fluid vector flow field through a measurement region which contains a plurality of volume elements comprising the steps of:
    transmitting and receiving acoustic energy through the measurement region along a plurality of rays through said region such that each volume element within the region in which flow is to be reconstructed is traversed by a set of rays having components in each direction for which flow components are to be reconstructed;
    measuring the time for transmission of the acoustic energy through the measurement region along said plurality of rays; and
    determining the speed of sound and fluid velocity throughout the measurement region by solving the simultaneous set of line integrals which relate the fluid velocity and sound speed to the measured propagation time along said rays.

2. The method of measuring and reconstructing vector components of fluid flow at a plurality of points within a measurement region bounded by a pair of acoustic transducer arrays, said arrays being in planes which are parallel to each other, comprising:
    transmitting and receiving acoustic energy through said measurement region in both directions along a plurality of paths between transducer pairs within the same array;
    measuring to determine the difference in acoustic propagation time in both directions between said pairs of transducers in said array;
    transmitting and receiving acoustic energy through said measurement region in both directions along a plurality of paths between transducer pairs in different arrays;

measuring to determine the difference in acoustic propagation time in both directions between said pairs of transducers in different arrays; and reconstructing the vector components of the fluid flow at a plurality of points traversed by said rays from the sets of propagation time differences.

3. The method of claim 2 wherein said step of transmitting comprises transmitting a composite impulse and burst signal.

4. The method of claim 3 wherein said step of measuring includes measuring group velocity of said impulse and measuring phase velocity of said burst.

5. Apparatus for measuring the fluid vector flow field within a measurement region which contains a plurality of volume elements, comprising:

means for transmitting and receiving acoustic energy through said measurement region along a plurality of rays through said region such that each volume element within the region in which flow is to be reconstructed is traversed by a set of rays having components in each direction for which flow components are to be reconstructed;

means for measuring the propagation time for the acoustic energy to the measurement region along said plurality of rays; and means for determining the speed of sound and fluid velocity throughout the measurement region by solving the simultaneous set of line integrals which relate the fluid velocity and sound speed to the measured propagation time along said rays.

6. Apparatus for measuring and reconstructing vector components of fluid flow at a plurality of points within a measurement region, comprising:

a first array of acoustic transducers mounted along a boundary of said measurement region and lying in a plane;

a second array of acoustic transducers mounted along a boundary of said measurement region and lying in a plane parallel to said first plane;

means connected to said transducers for energization thereof to cause transmission of acoustic energy through said measurement region;

means connected to said transducers for receiving acoustic energy transmitted through said measurement region along a plurality of rays through each of said volume elements for which a reconstruction is to be made;

means for measuring the difference in acoustic propagation time in both directions along said rays; and means for reconstructing the vector components of the fluid flow at a plurality of points traversed by said rays from said propagation time differences.

7. Apparatus according to claim 6 wherein said means for energization includes an impulse generator and a burst generator, and means for summing their outputs for application to a transducer.

8. Apparatus according to claim 7 wherein said measuring means comprises a impulse time of flight measuring circuit and a burst phase detecting circuit.

9. The method of claim 1 further including the step of determining the temperature distribution throughout the measurement region based upon the speed of sound determination.

* * * * *